United States Patent Office 3,499,762
Patented Mar. 10, 1970

3,499,762
PHOTOGRAPHIC ELEMENTS COMPRISING NOVEL U.V.-ABSORBING OPTICAL BRIGHTENING AGENTS
Homer W. J. Cressman and Robert J. Tuite, Rochester, N.Y., assignors to Eastman Kodak Company, Rochester, N.Y., a corporation of New Jersey
No Drawing. Filed Nov. 3, 1966, Ser. No. 591,688
Int. Cl. G03c 1/92, 1/84
U.S. Cl. 96—82                                             13 Claims

ABSTRACT OF THE DISCLOSURE 2-(nuclear substituted benzoxazolyl)-5-(nuclear substituted benzoxazolyl)thiophenes and 2-(nuclear substituted benzoxazolyl)-5-(nuclear substituted benzoxazolyl)thiazoles in which the benzene ring in each benzoxazolyl group has from two to four alkyl groups, are advantageously incorporated in at least one film-forming layer of a light-sensitive photographic element because these compounds are excellent ultraviolet-absorbing brightening agents that are characterized by being unexpectedly stable to prolonged exposure to radiation.

---

This invention relates to materials and processes for the improvement of radiation-sensitive materials. In one aspect, this invention relates to the optical brightening of radiation-sensitive materials. In another aspect, it relates to the protection of such materials from U.V. radiation.

The white areas of photographic color prints and other products, such as fibrous and plastic articles, are often made to look whiter by incorporating optical brightening agents. These brightening agents fluoresce on irradiation with U.V. light emitting visible light, usually bluish in hue, thus enhancing the whiteness of the object. Such products also frequently contain U.V.-sensitive ingredients such as dyes, organic polymers, etc., which require protection from irradiation in the U.V. region, especially from 360–400 m$\mu$. Optical brighteners are inherently U.V. absorbers, and depend on this characteristic for the energy required to fluoresce in the visible region of the spectrum. However, most of the known optical brightening agents either are decomposed by prolonged exposure to U.V. radiation or do not satisfactorily absorb the longer wavelength U.V. radiation, i.e., between about 360 and 400 m$\mu$, which is primarily responsible for the harmful effects produced in such products as color photographs, dyed plastic films, filaments, etc. If conventional U.V. absorbers are added, they will absorb part of the radiation needed to excite the optical brighteners and thus reduce their efficiency. Accordingly, there is a need for addenda which provide good efficiency both in optical brightening and absorbing the harmful U.V. radiation. We have found a novel class of compounds which function well as U.V.-absorbing filters and as optical brightening agents.

It is an object of our invention to provide new and improved fluorescent, U.V.-absorbing compounds.

It is another object of our invention to provide our new and improved fluorescent, U.V.-absorbing compounds which have an improved stability against radiation and an improved optical brightening power.

It is another object to provide radiation-sensitive materials containing our new and improved fluorescent, U.V.-absorbing compounds.

It is a further object of our invention to provide our new and improved materials which are more effectively protected against radiation and more effectively optically brightened by the incorporation therein of the fluorescent, U.V.-absorbing compounds of our invention.

It is another object of our invention to provide photographic materials containing the novel fluorescent, U.V.-absorbing compounds of our invention.

It is another object to protect the image dyes in photographic reflection prints against deteriorating U.V. radiation by the incorporation in the print material of the novel fluorescent U.V. absorbers according to our invention.

It is a further object of our invention to provide photographic reflection print materials having an improved optical brightness by the incorporation in the materials of the novel fluorescent U.V. absorbers of our invention.

It is another object of our invention to provide improved optically brightened supports for photographic reflection print materials.

It is another object to provide optical brightening agents which have an improved, prolonged capacity to absorb U.V. radiation and to emit light in the blue region of the visible spectrum.

These and other objects will appear from the following description of our invention.

These and other objects are accomplished according to our invention with our 2-(nuclear substituted benzoxazolyl)-5-(nuclear substituted benzoxazolyl)thiophene and 2-(nuclear substituted benzoxazolyl)-5-(nuclear substituted benzoxazolyl)thiazole ultraviolet-absorbing optical brightening agents which have from two to four alkyl substituents on the benzene ring of each benzoxazolyl group and include those having one or both the 3 and 4 positions on the thiophene nucleus or the 4 position on the thiazole nucleus substituted with an alkyl group and/or an aryl group.

Our U.V.-absorbing optical brightening agents include those represented advantageously by the Formula I.

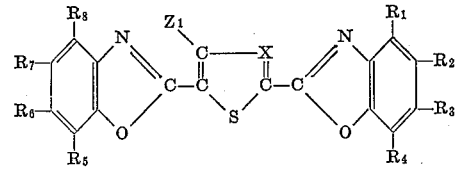

wherein X represents —N= or

and $Z_1$ and $Z_2$ are the same or different and each represents hydrogen, an alkyl group preferably having from 1 to 15 carbon atoms, e.g., methyl, benzyl, butyl, tertiary butyl, amyl, decyl, pentadecyl, etc. or an aryl group, e.g., phenyl, tolyl, ethylphenyl, etc.; and $R_1$, $R_2$, $R_3$ $R_4$, $R_5$, $R_6$, $R_7$, and $R_8$ are the same or different and each represents hydrogen or an alkyl group preferably having from 1 too 15 carbon atoms, e.g., methyl, benzyl, ethyl, phenethyl, butyl, tertiary butyl, amyl, t-amyl, cyclopentyl, n-hexyl, cyclohexyl, decyl, dodecyl, pentadecyl, etc., such that the total number of carbon atoms in the $R_1+R_2+R_3+R_4+R_5+R_6+R_7+R_8$ groups is not more than 80 and at least 2 of $R_1$, $R_2$, $R_3$ and $R_4$ and at least 2 of $R_5$, $R_6$, $R_7$ and $R_8$ are alkyl groups. Especially efficacious are the compounds of Formula I in which the R groups each have from 4 to 12 carbon atoms.

In addition to being efficient U.V.-absorbing filters as well as optical brightening agents, our novel compounds exhibit much greater stability on prolonged exposure to light and heat relative to that exhibited by those compounds corresponding to the general Formula II which are outside our invention:

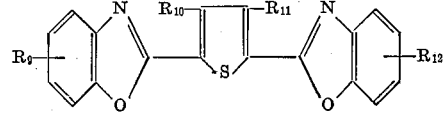

(II)

wherein $R_9$, $R_{10}$, $R_{11}$, and $R_{12}$ can be substituents other than hydrogen. As will be shown hereinafter, prior art brightening agents, including the disubstituted thiophene derivative such as those described by Formula II, are inferior as componets in photographic and other radiation-sensitive materials to the class of compounds of our invention.

One embodiment of our invention relates to the use of our thiazole and thiophene derivatives in photographic silver halide materials as U.V. absorbers. Another embodiment relates to the use of our thiophenes and thiazoles in photographic silver halide materials to serve as optical brightening agents. A further embodiment of our invention relates to the incorporation of our thiophenes and thiazoles in a hydrophilic colloid subbing layer coated over the support used for photographic reflection print materials for the purpose of optically brightening the support and photographic images recorded in siliver halide coatings made on such support.

Although it is preferred to incorporate our compounds in or above certain light-sensitive emulsion layers in a multilayer photographic material, they may advantageously also or instead be present in any other of the photosensitive or light-insensitive coating layers of photographic materials or in the support or a subbing layer applied to the support. They may be incorporated in color photographic materials which contain color-forming couplers or in such materials in which the images are formed by color development with color-forming couplers contained in the developing solution. Our compounds may likewise be used effectively to protect and brighten color photographic elements of the types used in silver-dye-bleach processes, i.e. with color films wherein the dye is present before exposure and which is bleached in accordance to silver images produced during regular black-and-white development.

Our thiophenes and thiazoles are also effective U.V.-absorbing materials used in diffusion transfer processes such as, for example, in processes whereby color photographic records are reproduced by transferring either solubilized or coupler-developed dyes from a light-sensitive element to a receiving sheet. In such cases our thiophenes and thiazoles are preferably incorporated in the receiving element. Other suitable applications are found for the thiophenes and thiazoles described in our invention in dye imbibition transfer procedures or in any process which replies on the photographic or photomechanical reproduction of images, particularly reflection images in color.

As will be shown hereinafter, the compounds according to our invention are used advantageously in one or more hydrophilic colloid layers of photographic elements, particularly for color photographic reflection prints.

When employed in photography, the compounds of our invention are advantageously incorporated in the hydrophilic film-forming layer or layers so as to be present in the finished image-recording print material at concentrations ranging from approximately 1 to 50 mg./ft.$^2$ of the dry coating, or preferably at a concentration ranging between a coverage of about 7 and about 20 mg./ft.$^2$. The concentration of our tetrasubstituted-, hexasubstituted-, and octasubstituted-thiophenes and-thiazoles can alternatively be expressed in terms of their quantity relative to the solvent used for their dispersion in the coating composition. Accordingly, our compounds are dissolved at concentratitons of about 3% in relatively liquid solvents such as, for example, tri-o-cresyl phosphate, dibutyl phthalate, di-octyl phthalate, diethyl lauramide, etc., and in more viscous solvents such as, for example, polymeric resins, typical examples of which are the copolymer of butyl-acrylate and acrylic acid, methyl-methacrylate and acrylic acid; styrene and esters of acrylic acids such as ethylacrylate, ethylmethacrylate; also terpolymers prepared by the copolymerization of styrene or vinylidene chloride with an alkylacrylate or methacrylate, e.g., butylacrylate or methacrylate and acrylic or methacrylic acid. While it is preferred to introduce the U.V.-absorbing brightening agents in the photographic material before the coating of the film-forming layers on the support, the agents may optionally also be applied to or into the material after coating. This may be accomplished by, for example, either brushing or imbibition techniques.

Solvents used to advantage for incorporation of couplers, such as those described in U.S. Patents 2,304,939, 2,322,027, 2,801,170, 2,801,171, 2,949,360 and 2,272,191 are also used to advantage as solvents for incorporating U.V.-absorbing brightening agents of our invention in photographic layers.

Solvent solutions of our compounds are advantageously incorporated by solution or dispersion in any of the hydrophilic colloid binders used in photographic elements, including natural materials, e.g., gelatin, albumin, agar-agar, gum arabic, alginic acid, etc., and synthetic materials, e.g., polyvinylalcohol, polyvinyl pyrrolidone, cellulose ethers, partially hydrolyzed cellulose acetate, etc.

Among the compounds included in our invention are the following which are presented to exemplify but not limit our invention.

(1) 2,5-bis(5,7-di-t-amylbenzoxazolyl)-3,4-diphenyl-thiophene
(2) 2,5-bis(5,7-di-n-amylbenzoxazolyl)thiophene
(3) 2,5-bis(5,7-di-t-amylbenzoxazolyl)thiophene
(4) 2,5-bis(5,7-di-t-amylbenzoxazolyl)-3,4-dimethyl-thiophene
(5) 2,5-bis(5,7-di-n-octylbenzoxazolyl)thiophene
(6) 2,5-bis(5-pentadecyl-7-methylbenzoxazolyl)thio-phene
(7) 2,5-bis(5,7-di-methylbenzoxazolyl)thiophene
(8) 2,5-bis(4,6,7-trimethylbenzoxazolyl)thiophene
(9) 2,5-bis(5-ethyl-7-cyclohexyl)thiophene
(10) 2,5-bis[5-propyl-7-($\alpha$-methylpropyl)]-3,4-dimethyl thiophene
(11) 2,5-bis(5-benzyl-7-ethyl)thiophene
(12) 2,5-bis(4,5,6,7-tetramethylbenzoxazolyl)thiophene
(13) 2-(5,7-dimethylbenzoxazolyl)-5-(5,7-di-t-amyl-benzoxazolyl)thiophene
(14) 2-(5,7-di-t-amylbenzoxazolyl)-5-(5-ethyl-7-propyl-benzoxazolyl)-3-methylthiophene
(15) 2-(5,7-dipentadecylbenzoxazolyl)-5-(7-cyclopen-tyl-5-methyl)thiophene
(16) 2-(4,5,6,7-tetraamylbenzoxazolyl)-5-(4,6,7-tri-methylbenzoxazolyl)thiophene
(17) 2-(5,7-di-t-butylbenzoxazolyl)-5-(5,7-dipropyl-benzoxazolyl)thiophene
(18) 4-methyl-2,5-di(5,7-di-t-amylbenzoxazolyl)thi-azole, U.V. absorbers and optical brighteners other than those included in our invention, but which have been used to illustrate our invention, are also listed below. They will be referred to hereinafter by the capital letter denoting each compound.

(A) 2,5-bis(5-n-octylbenzoxazolyl)thiophene
(B) 2,5-bis-benzoxazolylthiophene
(C) 2,5-bis(5-t-butylbenzoxazolyl)thiophene
(D) 2,5-bis(6-t-butylbenzoxazolyl)thiophene
(E) 2,5-bis[5-($\beta$-carbethoxyethyl)benzoxazolyl]thio-phene
(F) 7-[$\beta$-dimethylamino)ethylureido]-3-phenylcou-marin

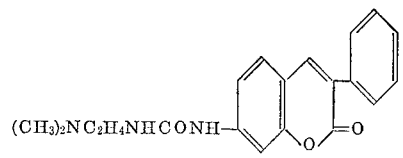

(G) 2,2'-[vinylenebis-(p-phenylene)]-5,7-di-t-amyl-benzoxazole (H) 2-(2-hydroxy-3,5-di-t-amylphenyl)benzotriazole

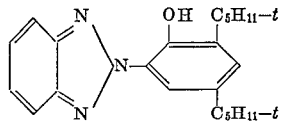

(I) 2,5-bis(6-pentadecylbenzoxazolyl)thiophene

In general, the novel compounds of our invention are prepared by reacting the appropriately substituted thiophene 2,5-dicarbonyl chloride or the corresponding thiazoles with the appropriately substituted o-aminophenol. The resulting compound of Formula III is then converted to the corresponding compound of Formula I by heating to an elevated temperature advantageously in the presence of boric acid.

Formula III

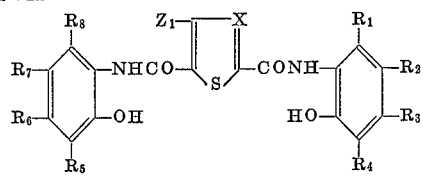

In Formula III, $R_1$, $R_2$, $R_3$, $R_4$, $R_5$, $R_6$, $R_7$, $R_8$, $Z_1$ and $X$ are as defined previously.

The appropriately substituted o-aminophenols used in the above reaction to prepared the compounds corresponding to Formula III are, in general, prepared by nitrating the phenols in accordance with the process disclosed in U.S. Patent 2,207,727, or that described in J.A.C.S., 76, 4987(1954). The nitrophenol intermediate thus formed is then catalytically reduced to the corresponding aminophenol.

The following specific examples described in detail the preparation of several of the typical compounds of our invention.

EXAMPLE 1

Preparation of compound 3

(A) Intermediate 2-amino-4,6-di-t-amylphenol.—A solution of 234 g. (1.0 mole) of 2,4-di-t-amylphenol in 600 ml. of glacial acetic acid was stirred at 10–12°, while 127 ml. of nitric acid diluted with 190 ml. of water was added, dropwise, over a three-hour period. Agitation of the mixture was continued for an additional hour, allowing the temperature to rise to 20°. The reaction mixture was then poured into 6 liters of water (10–12°), and the aqueous layer decanted. The crude product was dissolved in 6 liters of ether, neutralized with 2% $NaCHO_3$ solution, washed with water, and dried over $MgSO_4$. The residue obtained on evaporation of the solvent was dissolved in 1200 ml. of ethanol and divided equally among 6 bottles of a Burgess-Parr reduction apparatus. Raney nickel catalyst (0.3–0.5 g.) was added to each bottle, and the mixture was shaken at room temperature in an atmosphere of hydrogen under an initial pressure of 50 p.s.i. until no more hydrogen was taken up. The reduction mixture was heated on a steam bath to dissolve the white solid that had separated; the catalyst was then removed by suction filtration. The filtrate was concentrated to dryness under diminished pressure. Recrystallization of the residue from ligroin (B.P. 66–75°) gave 102 g. of white needles, M.P. 136–138°.

(B) Preparation of the final product, compound 3.— To a stirred mixture of 9.6 g. of the above intermediate 2-amino-4, 6-di-t-amylphenol, 200 ml. of acetic acid, and 3.2 g. of anhydrous sodium acetate was added over a one-minute period 4.0 g. of thiophene-2,5-dicarbonyl chloride (J. M. Griffing and L. F. Salisbury, J.A.C.S., 70, 3418(1948)) dissolved in 50 ml. of acetic acid. The tempearture of the reaction mixture rose from 25° to 30°; the whole was heated to 45° for one-half hour and then allowed to cool to room temperature. The product which separated was collected by filtration, transferred to a beaker, and stirred for 20 minutes with 100 ml. of water. The insoluble bis-amido intermdiate was collected by filtration, washed with 50 ml. of cold methanol, and air dried, yielding 9.0 g. of solid, M.P. 238–240°.

An intimate mixture of 8.0 g. of the bis-amido compound and 0.4 g. of boric acid in a 200 ml. Berzelius-type beaker was hand-stirred for 45 minutes under nitrogen while being heated above its melting point (oil bath temperature 255°). Stirring and heating was stopped after bubbling ceased. The cooled melt was dissolved in 125 ml. of chloroform and washed with water. The organic layer was stirred with anhydrous sodium sulfate and 1.0 g. of Darco decolorizing charcoal and filtered. The filtrate was concentrated to dryness under reduced pressure. Two recrystallizations of the residue from ethyl alcohol gave 5.3 g. of white crystals, M.P. 140–141° C.

EXAMPLE 2

Preparation of compound 2

(A) Intermediate 2,4-di-n-amyl-6-nitrophenol.—To a stirred mixture of 30 ml. of concentrated nitric acid diluted with an equal volume of water containing a trace of sodium nitrite was added, dropwise, over a two-hour period, a solution of 93.6 g. (0.4 mole) of 2,4-di-n-amylphenol in 150 ml. of benzene, the temperature being kept below 10° by external cooling. Agitation of the mixture was continued for an additional hour at 15–18°. The organic layer was separated, washed with water, dried, and concentrated. The oily residue gave 79.4 g. of dark red oil, B.P. 152–155°/0.5 mm.

(B) Intermediate 2-amino-4,6-di-n-amylphenol hydrochloride.—A mixture of 27.9 g. of intermediate A above, 260 ml. of ethyl acetate, and 0.5–1.0 g. of 10% pd/carbon catalyst was treated in the manner described under Example 1. The theoretical amount of hydrogen was absorbed in one hour. The hydrochloride obtained by passing hydrogen chloride into the cooled solution of the amine in acetonitrile (250 ml.), melted at 196–198° C. The yield was 21.2 g.

(C) Preparation of the final product, compound 2.—A mixture of intermediate B above, 350 ml. of acetic acid, 14.0 g. of anhydrous sodium acetate, and 8.4 g. of thiophene-2,5-dicarbonyl chloride was treated in the manner described under Example 1. Distillation of the crude reaction product, B.P. 312–315/0.5 mm., followed by recrystallization from alcohol gave white crystals, M.P. 45–48°.

EXAMPLE 3

Preparation of compound 1

A mixture of 5.9 g. of 2-amino-4,6-di-t-amylphenol, 100 ml. of acetic acid, 2.0 g. of anhydrous sodium acetate, and 4.2 g. of 3,4-diphenylthiophene-2,5-dicarbonyl chloride (J.A.C.S., 70, 3418(1948)) [1] was processed in the manner described under Example 1. The reaction product after two recrystallizations from ethyl alcohol and final recrystallization from acetic acid yielded white crystals, M.P. 222–224°.

[1] The 3,4-diphenylthiophene-2,5-dicarboxylic acid used to make the acid chloride was prepared from benzil and diethylthiodiacetate by the method described in J.A.C.S., 72, 4860 (1950). The mechanism of the reaction is discussed in J.A.S.C., 87, 1739 (1965).

EXAMPLE 4

Compound 4 was prepared by a synthesis similar to that described for compound 1 excepting that an equimolar amount of 3,4-dimethylthiophene-2,5-dicarboxylic acid was used in place of 3,4-diphenylthiophene-2,5-dicarboxylic acid.

Compounds 5, 6, 7, 8, 9, and 11 are advantageously prepared by syntheses similar to that use of compound 2 but in which equimolar amounts of the substituted o- aminophenols indicated in the following table are used in place of 2-amino-4,6-di-n-amylphenol.

Compound: Substituted o-aminophenol
5 _____ 2-amino-4,6-dioctylphenol.
6 _____ 2-amino-6-methyl-4-pentadecylphenol.
7 _____ 2-amino-4,6-dimethylphenol.
8 _____ 2-amino-3,5,6-trimethylphenol.
9 _____ 2-amino-6-cyclohexyl-4-ethylphenol.
11 _____ 2-amino-4-benzyl-6-ethylphenol.

Compound 12 is advantageously prepared as follows: 1,2,3,4-tetramethylbenzene is reacted with nitric acid to give the mononitro derivative which is then reduced to the corresponding amine. The amine derivative is then treated with nitrous acid, followed by hydrolysis using procedures well known in the art to make 2,3,4,5-tetramethylphenol which is then nitrated and the nitro group reduced to the amine as before. The 6-amino-2,3,4,5-tetramethylphenol is then condensed with thiophene diacid chloride yielding a diamide which upon heating in a vacuum gives compound 12.

Compound 10 is advantageously prepared by a synthesis similar to that used for making compound 1 except that an equimolar amount of 2-amino-4-propyl-6-(α-methylpropyl)phenol is used in place of 2-amino-4,6-di-t-amylphenol and an equimolar amount of 3,4-dimethylthiophene-2,5-dicarbonyl chloride is used in place of 3,4-diphenylthiophene-2,5-dicarbonyl chloride.

Compound 13 is advantageously prepared as follows: thiophene-2,5-dicarboxylic acid is treated with thionyl chloride to form the thiophene diacid chloride which is isolated and treated with an excess of phenol in slightly alkaline solution to yield the diester. The monoester is obtained by partial hydrolysis of the diester, then the free carboxylic acid group of the monoester is transformed into the acid chloride by treatment with thionyl chloride. The acid chloride derivative is reacted with 2,4-dimethyl-6-aminophenol to give the corresponding monoamide which is then reacted under more vigorous conditions with 2,4-di-t-amyl-6-aminophenol to give an intermediate which, upon heating in a vacuum provided compound 13.

Compounds 14, 15, 16 and 17 are prepared by syntheses similar to that used for making compound 13 but in which equimolar amounts of the substituted aminophenols indicated in the following table as A are used in place of 2,4-dimethyl-6-aminophenol to make the corresponding monoamide, and the substituted aminophenols indicated in the table as B are used in place of 2,4-di-t-amyl-6-aminophenol to make the diamide.

| Compound | Aminophenol A | Aminophenol B |
| --- | --- | --- |
| 14 | 2-amino-4,6-di-t-amylphenol. | 2-amino-4-ethyl-6-propylphenol. |
| 15 | 2-amino-4,6-dipentadecylphenol. | 2-amino-4-methyl-6-cyclopentylphenol. |
| 16 | 2-amino-3,4,5,6-tetraamylphenol. | 2-amino-3,5,6-trimethylphenol. |
| 17 | 2-amino-4,6-di-t-butylphenol. | 2-amino-4,6-dipropylphenol. |

Compound 18 was prepared using the following procedure:

Ethyl α-chloroacetoacetate was prepared by chlorination of ethyl acetoacetate with sulphuryl chloride according to the method reported in Organic Synthesis, 33, 45.

5-ethoxycarbonyl-2,4-dimethylthiazole was prepared by the condensation of thioacetamide and ethyl α-chloroacetoacetate according to the method reported in Ann., 1889, 250, 260.

5-carboxy-2,4-dimethylthiazole was prepared by the hydrolysis of 5-ethoxycarbonyl-2,4-dimethylthiazole according to the method reported in J. Chem. Soc., 601 (1945).

4-methylthiazole-2,5-dicarbonylchloride was prepared by the oxidation/chlorination reaction of thionyl chloride on 5-carboxy-2,4-dimethylthiazole according to the method reported in J. Chem. Soc., 601 (1945).

4 - methyl - 2,5 - di(5,7-di-t-amylbenzoxazolyl)thiazole.—2-amino-4,6-di-t-amylphenol (50 g.) and calcium oxide (100 g.) were added to o-dichlorobenzene (1600 ml.) which had been heated to 100° C. and allowed to be stirred for 5 minutes. 4-methylthiazole-2,5-dicarbonylchloride (18 g.) was added and the rapidly stirred mixture refluxed for 3 hours. The reaction mixture was filtered hot and the o-dichlorobenzene distilled off, the final traces being distilled under vacuum pressure (13 mm. of Hg.). The residue while still being under vacuum was then heated in an oil bath at 250° C. for about 15 minutes. The black oil was dissolved in alcohol and treated with activated charcoal for several days, filtered and the alcohol distilled off under reduced pressure yielding 20 g. of black oil. Separation by chromatography on silica gel using benzene as the mobile phase gave a brown oil which crystallised form alcohol. Two recrystallisations from alcohol gave a yellow crystaline compound, M.P. 125–7° C.

The examples outlined below are intended to further described the various embodiments of our invention.

EXAMPLE 5

Seven single-layer gelatinous emulsion coatings were made by (a) separately dissolving 0.1 g. of each of the fluorescent U.V.-absorbing compounds listed in Table 1 in 10-g. portions of diethyllauramide, dispersing the resulting solutions in 60-g. portions of a 10% aqueous solution of photographic gelatin, adding 0.5 ml. of Saponin and enough water to each portion to make a total volume of 125 ml.; and (b) coating each of the above preparations on a transparent cellulose acetate film support at a coverage of approximately 10 mg./ft.$^2$ of the respective U.V.-absorbing compound, 1000 mg./ft.$^2$ of diethyllauramide, and 600 mg./ft.$^2$ of gelatin.

Spectrophotometric absorption curves were drawn of each of the above coatings both immediately after drying and after having been exposed for 10 days to a fadometer providing a light quality which simulates average North skylight at 500 foot candles intensity (SANS fading test). The absorption curves for coatings 1–6 showed a primary maximum at about 375 mμ and two secondary maxima at about 357 and 395 mμ. The absorption curve for coating 7 was bathochromically shifted by about 10 mμ so that its maximum absorption peak was registered at about 385 mμ. The ΔD values listed in Table 1 represent the differences in amount of obsorption by the coatings before and after the fading test at the respective primary absorption maxima described above.

TABLE 1

| Ctg. No. | U.V., Absorbing Compound Used | ΔD |
| --- | --- | --- |
| 1 | B outside invention | −0.39 |
| 2 | C outside invention | −0.38 |
| 3 | D outside invention | −0.40 |
| 4 | E outside invention | −0.36 |
| 5 | 3 of invention | −0.15 |
| 6 | 2 of invention | −0.12 |
| 7 | 1 of invention | +0.05 |

The results indicate that the thiophene derivatives according to our invention are more stable under adverse fading conditions than are either unsubstituted or disubstituted analogous compounds. This stability affords a prolonged effective protection of photographic dye images which may be superposed by a film-forming layer containing the thiophene derivatives according to our invention.

The superiority of the compounds of our invention as fluorescent U.V. absorbers for the protection of photographic image-forming dyes is illustrated by the following example.

EXAMPLE 6

Three single-layer coatings were prepared on a transparent poly(ethylene terephthalate) film support, each of which coatings contained 600 mg./ft.$^2$ of gelatin, 50 mg./ft.$^2$ of the magenta dye 1-(2,4,6-trichlorophenyl)-3-{3-[α-(3 - pentadecylphenoxy)butyramido]benzamido}-4-{4-[N-ethyl - N - (β-methylsulfonamidoethyl)amino]-2-methylphenylimino-5-pyrazolone, and 250 mg./ft.$^2$ of tri-o-cresyl phosphate.

One of the three samples was superposed with a control gelatinous coating containing no fluorescing U.V. absorber, whereas the remaining two samples were superposed with a similar gelatinous layer containing the respective fluorescent U.V. absorber as listed in Table 2. The superposed layers were composed of 10 mg./ft.$^2$ of the U.V. absorber as listed in Table 2, 1000 mg./ft.$^2$ of diethyllauramide, and 600 mg./ft.$^2$ of gelatin.

Each of the three coatings was spectrophotometrically evaluated before and after a 10-day fading test as described in Example 5 above. The differences between the highest density to green light of the magenta dye in each coating before and after the fading test are recorded in Table 2.

TABLE 2

| Ctg. No.: | ΔD |
|---|---|
| 1—blank gel overcoat | −1.38 |
| 2—Cpd. A in overcoat (outside invention) | −0.70 |
| 3—Cpd. 3 in overcoat (of invention) | −0.51 |

This example shows that the dye in the sample which was superposed with a fluorescent U.V. absorber according to our invention faded considerably less than the same dye in either the non-protected sample or in the sample protected by the prior-art fluorescent U.V. absorber.

The following example illustrates the superior brightening capacity of the fluorescent U.V.-absorbing thiophene derivatives of our invention as compared with disubstituted thiophene derivatives and other prior art brightening agents.

EXAMPLE 7

Eight single-layer coatings were prepared on an untinted baryta-coated photographic paper support. Each of the layers contained 600 mg./ft.$^2$ of photographic gelatin, 10 mg./ft.$^2$ of the respective fluorescent U.V.-absorber as listed in Table 3, and 1000 mg./ft.$^2$ of diethylauramide.

The coatings were spectrophotometrically evaluated as described below, before and after having been subjected to a fading test similar to those tests described in Examples 5 and 6 above.

TABLE 3

| Ctg. No. | Fluorescent U.V. Absorber | Emission max. (mμ) | Peak Relative Radiance Fresh Test | Peak Relative Radiance 10-Day Fading Test |
|---|---|---|---|---|
| 1 | None (control) | | [1] 84 | [1] 84 |
| 2 | Compound B | 427 | 96 | 96 |
| 3 | Compound I | 436 | 93 | 91 |
| 4 | Compound F | 435 | 100 | 91 |
| 5 | Compound 3 | 435 | 101 | 102 |
| 6 | Compound 2 | 435 | 101 | 102 |
| 7 | Compound 1 | 446 | 101 | 102 |

[1] Relative radiance as measured at 435 mμ.

The data recorded in the above table illustrate that coatings 5, 6, and 7, i.e., those coatings containing the compounds according to our invention, have greater blue light emission capacity than those coatings containing brightening agents which are outside of our invention.

Procedure by which the above spectrophotometric evaluation was made.—The test sample was illuminated, before and after the 10-day fading exposure, with a 3000° K. tungsten light source. While being so illuminated, the sample reflected light and also emitted light by virtue of its fluorescence. The total light radiated by the sample was passed through a monochrometer to a light-detecting device which recorded the sum of the reflected and fluorescent radiation (=Radiance) at the respective wavelength indicated in Table 3. The values listed in the columns under "Peak Relative Radiance" in Table 3 represent the recorded quantity of radiance, in percent, compared against a radiance of 100% exhibited at all wavelengths by HgO.

The example presented below illustrates the excellent retention of brightening power of the tetrasubstituted thiophene fluorescent U.V. absorbers according to our invention in a photographic material in the presence of dye-forming couplers.

EXAMPLE 8

Seven single-layer coatings were prepared on an untinted pigmented baryta support as described in Example 7. Coatings 2–7 contained 7.5 mg./ft.$^2$ of the fluorescent U.V.-absorbing compound 3, 150 mg./ft.$^2$ of the respective yellow-dye-forming coupler compound as shown in Table 4, 75 mg./ft.$^2$ of the coupler solvent di-n-butylphthalate, and 600 mg./ft.$^2$ of photographic gelatin.

Coating 1 was identical to coating 2 except that it did not contain the fluorescent U.V. absorber.

Each coating was spectrophotometrically evaluated by recording its relative radiance as described in preceeding examples. The results are tabulated in Table 4.

TABLE 4

| Ctg. No. | Coupler [1] | Peak Rel. Rad. |
|---|---|---|
| 1 (control) | Cplr. a | 83 |
| 2 | Cplr. a | 100 |
| 3 | Cplr. b | 102 |
| 4 | Cplr. c | 101 |
| 5 | Cplr. d | 102 |
| 6 | Cplr. e | 103 |
| 7 | Cplr. f | 103 |

TABLE 4a

Coupler a: α-Pivalyl-2-chloro-5-[γ - (2,4 - di - t - amylphenoxy)butyramido]acetanilide Coupler b: α-pivalyl-α-acetoxy-5-[γ-(2,4 - di - t - amylphenoxy)butyramido]-2-chloroacetanilide Coupler c: α-Pivalyl-α-(4-carboxyphenoxy) - 2 - chloro-5-[γ-(2,4-di-t-amylphenoxy)butyramido]acetanilide Coupler d: α-Pivalyl-4-(N-methyl-N-n-octadecylsulfamyl)acetanilide Coupler e: α-Pivalyl-α-acetoxy-4-(N-methyl - N - octadecylsulfamyl)acetanilide Coupler f: α-Pivalyl-α-stearoyloxy - 4 - (N,N - dimethylsulfamyl)acetanilide Coupler g: α-[4-(-Benzyloxyphenylsulfonyl)phenoxy]-α-pivalyl-2-chloro-5-[γ-(2,4-di - t - amylphenoxy)butyramido]acetanilide Coupler h: α-Pivalyl-2,5-dichloro-4-(N-methyl-N-n-octadecylsulfamyl)acetanilide In a typical color photographic material wherein images are produced by color development, the optical brightening agents are advantageously incorporated in the yellow-dye-forming layer, and they are quenched as a function of the dye-forming process. The fluorescent U.V. absorbers of our invention are very effectively used in this manner, as is shown in Example 9 below.

EXAMPLE 9

Four single-layer coatings were prepared as described in Example 8. Their composition with respect to fluorescent U.V. absorber and kind of coupler compound is shown in Table 5. Each coating was exposed through a 0.5 log E neutral density step tablet and processed as described below. The relative radiance of each coating in the D min. area was determined at an emission peak of approximately 435 mμ and listed as shown in Table 5.

Processing

Development for 10 minutes at a temperature of 68° F. in a developer solution having the following composition.

| | | |
|---|---|---|
| $H_2O$ | ml | 800 |
| Benzyl alcohol | ml | 4 |
| Calgon | g | 0.5 |
| $Na_2SO_3$ | g | 2.0 |
| 40% aqueous NaOH solution | ml | 0.4 |
| Developing agent [1] | g | 5.0 |
| $Na_2CO_3 \cdot H_2O$ | g | 50.0 |
| 50% aqueous NaBr solution | ml | 1.72 |

$H_2O$ to 1 liter.
pH—10.75.

[1] Ethyl-N-($\beta$ - methanesulfonamidoethyl)-3-methyl-4-aminoaniline.

Stop-fixing for 5 minutes at a temperature of 68° F. in the fixing bath having the composition described below.

| | | |
|---|---|---|
| $H_2O$ | ml | 800 |
| Sodium thiosulfate | g | 240 |
| Sodium sulfite (desicc.) | g | 15 |
| 28% acetic acid | ml | 48 |
| Boric acid, crystals | g | 7.5 |
| Potassium alum | g | 15.0 |

$H_2O$ to 1 liter.
pH—4.25.

Washing in $H_2O$ at 68° F. for 5 minutes.
Silver bleaching at 68° F. for 5 minutes in a solution containing:

| | | |
|---|---|---|
| $H_2O$ | ml | 800 |
| NaBr | g | 21.5 |
| $K_3Fe(CN)_6$ | g | 100.0 |
| $Na_3PO_4 \cdot H_2O$ | g | 0.07 |

$H_2O$ to 1 liter.
pH—7.0.

Washing in $H_2O$ at 68° F. for 5 minutes.
Fixing as described above under stop-fixing.
Washing in $H_2O$ at 68° F. for 10 minutes.
Drying.

TABLE 5

| Ctg. No. | Coupler [1] | Fluorescent U.V. Absorber | Peak Rel. Rad. |
|---|---|---|---|
| 1 | Coupler a | None | 84 |
| 2 | Coupler a | Compound 3 | 100 |
| 3 | Coupler g | do | 103 |
| 4 | Coupler h | do | 104 |

[1] See Table 4a

Because of their excellent fluorescing properties, the subject compounds of our invention can also advantageously be used in a layer or layers other than above the magenta-dyeforming layer for the purpose of brightening only. Accordingly, the immediate thiophene derivatives may be incorporated in any of the light-sensitive or light-insensitive film-forming layers of a multilayer photographic reflection print material, including any subbing layer or layers which may be present between the lowest film-forming layer and the support or on the side of the support opposite the emulsion. Several preferred arrangements as to the location of the fluoroescent U.V. absorbers of our invention in photographic multilayer materials are illustrated in Example 10.

EXAMPLE 10

Multilayer coatings were prepared on a white paper support whose structure and composition are shown below. The numerical values represent the quantity of the respective component in mg./ft².

Coating No. 1 (control)

Layer 6—Gelatin overcoat—Gelatin, 175
Layer 5—Red-sensitive silver bromoiodide emulsion containing a cyan dye-forming coupler—Silver, 45; gelatin, 136; coupler, 35; coupler solvent, 17.5
Layer 5—Gelatin interlayer—Gelatin, 200
Layer 3—Green-sensitive silver bromoiodide emulsion containing a magenta dye-forming coupler—Silver, 55; Gelatin, 200; coupler, 55; coupler solvent, 55
Layer 2—Gelatin interlayer—Gelatin, 100
Layer 1—Blue-sensitive silver bromoiodide emulsion containing a yellow dye-forming coupler—Silver, 80; Gelatin, 200; coupler, 127; coupler solvent, 63

////////// Support ////////////

Coating No. 2

This coating was identical to Coating No. 1, except that it contained, in addition, 133 mg./ft.² of the U.V. absorber Compound H in layer 4.

Coating No. 3

This coating was identical to Coating No. 1, except that it contained, in addition, 10 mg./ft.² of the fluoroescent U.V. absorber compound 3 according to our invention and 250 mg./ft.² 85:15 butyl acrylate-acrylic acid copolymer in layer 4.

Coating No. 4 (control)

Layer 6—Gelatin overcoat—Gelatin, 175
Layer 5—Red-sensitive silver bromoiodide emulsion containing a cyan dye-forming coupler—Silver, 45; gelatin, 136; coupler, 35; coupler solvent, 17.5
Layer 4—Gelatin interlayer—Gelatin, 200
Layer 3—Blue-sensitive silver bromoiodide emulsion containing a yellow dye-forming coupler—Silver, 50; gelatin, 200; coupler, 100; coupler solvent, 100
Layer 2—Gelatin interlayer—Gelatin, 200
Layer 1—Green-sensitive silver bromoiodide emulsion containing a magenta dye-forming coupler—Silver, 55; gelatin, 200; coupler, 55; coupler solvent, 55

/////////////// Support /////////

Coating No. 5

This coating was identical to Coating No. 4, except that it contained, in addition, 133 mg./ft.² of the U.V.-absorbing compound H in layer 2.

Coating No. 6

This coating was identical to Coating No. 5, except that it contained, in addition, 8 mg./ft.² of the fluoroescent U.V. absorber compound 3 in layer 3.

Coating No. 7

This coating was identical to Coating No. 5, except that it contained in layer 3, in addition, 8 mg./ft.² of the U.V. absorber compound G.

All of the multilayer coatings, i.e., coatings 1–7, were sensitometrically exposed to a multicolor variable-intensity test object in a 1B Sensitometer and processed in a cycle as described in Example 9. The processed coatings were then evaluated by:

(a) Recording spectrometric curves for each color image, i.e., for the yellow, magenta and cyan colored images reproduced in the initially blue-, green-, and red-sensitive silver halide emulsion layers, respectively;

(b) Subjecting the coatings to a 28-day SANS fading test as described in previous examples; and (c) Again recording spectrophotometric curves as described in (a) above.

The magenta image dye in layer 3 of Coating 1 (control) faded substantially more than that in layer 3 of Coating 2. The magenta image dye in Coating 3 was more stable because of the protection from U.V. radiation afforded it by the U.V.-absorbing compound H which was incorporated into interlayer 4 of said Coating 2. The magenta image dye in layer 3 of Coating 3, also, exhibited light stability equal to that of the image dye of Coating 2. This improvement in light stability of the magenta image dye in this coating is due to the U.V.- filtering effect of our Compound 3. Further, the highlight areas in Coating 3 were whiter than those of either Coating 1 or 2. This increased brightening of the highlight areas in this coating is due to the brightening action of our compound 3.

In Coating 4 (control) the magenta image dye in Layer 1 faded substantially more than that of either Coatings 5, 6, or 7, respectively. Although, as mentioned above, the light stability of the magenta dye of Layer 1, Coating 5 was better than that of the control Coating 4, a comparison of the highlight areas of Coating 5 to the prints of the corresponding fresh Coatings 6 and 7, respectively, showed clearly that both Coatings 6 and 7 were much whiter in these areas than was Coating 5.

However, comparison of the prints produced on Coatings 6 and 7, respectively, after the 28-day SANS fading test showed clearly that the highlight areas of Coating 6 (i.e., containing Compound 3 of our invention) were substantially whiter than those corresponding areas of Coating 7 (i.e., containing compound G, a brightening agent of the prior art).

This improved brightness retention of Coating 6 relative to that of Coating 7 after fading is caused by the improved stability of the brightening agent of our invention relative to that of the prior art compound.

EXAMPLE 11

4 - methyl - 2,5 - di-(5,7-di-t-amylbenzoxazolyl)thiazole (compound 18) (0.0125 g.) was dissolved in dibutyl phthalate (1.62 ml.) and the solution dispersed in a 10% by weight aqueous gelatin (3.8 ml.) containing a 5% aqueous solution of triisopropylnaphthalene sulphonic acid (0.05 ml.) as a dispersing agent, at 40° C., with rapid stirring. A further quantity of 10% gelatin solution (26 ml.) was added and the stirring continued. The resulting dispersion was coated on non-fluorescent paper (over a gelatin pad of 10% by weight aqueous gelatin solution per sq. ft.) at 12.5 ml. dispersion per sq. ft. The fluorescence of the dried coating was measured, then the coating was exposed to South daylight for known periods and the fluorescence remeasured.

The fluorescence of this coating was considerably more stable to light than similar coatings of a commercially available oil-soluble optical brightener such as compound F or coatings containing commercially available water-soluble optical brighteners such as 4,4'-Bis(substituted 1''-3''-5''-triazin-2''-ylamino)stilbene disulfonic acid sodium salts (e.g., Leucophor B, Leucophor C) and Blankophor PRS.

Our compounds are excellent ultraviolet-absorbing optical brightening agents that are characterized by being unexpectedly stable to prolonged exposure to radiation. These characteristics make them particularly valuable for use in the hydrophilic colloid layers of photographic elements for protecting one or more layers, especially image dye bearing layers against ultraviolet radiation and/or for optical brightening of photographic images, especially in color prints.

The invention has been described in detail with particular reference to preferred embodiments thereof but it will be understood that variations and modifications can be effected within the spirit and scope of the invention as described hereinabove and as defined in the appended claims.

We claim:

1. A photographic element having a support coated with at least one film-forming layer containing an ultraviolet-absorbing optical brightening compound selected from the class consisting of a 2-(nuclear substituted benzoxazolyl)-5-(nuclear substituted benzoxazolyl)thiophene and a 2-(nuclear substituted benzoxazolyl)-5-(nuclear substituted benzoxazolyl)thiazole in which the benzene ring of each benzoxazolyl group has as nuclear substituents from two to four alkyl groups and at least one film-forming layer containing light sensitive silver halide.

2. A photographic element of claim 1 in which the ultraviolet absorbing optical brightening compound has the formula:

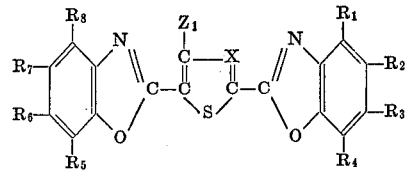

wherein X represents a member selected from the class consisting of —N=, and

$Z_1$ represents a member selected from the class consisting of hydrogen, an alkyl group, and an aryl group; $Z_2$ represents a member selected from the class consisting of hydrogen, an alkyl group, and an aryl group; and $R_1$, $R_2$, $R_3$, $R_4$, $R_5$, $R_6$, $R_7$, $R_8$ each represent a member selected from the class consisting of hydrogen and an alkyl group such that at least two of $R_1$, $R_2$, $R_3$, and $R_4$ represent alkyl groups, and at least two of $R_5$, $R_6$, $R_7$, and $R_8$ represent alkyl groups.

3. A photographic element of claim 2 in which X in the general formula represents

4. A photographic element of claim 1 in which the ultraviolet absorbing optical brightening compound is incorporated in a hydrophilic colloid layer coated over at least one light-sensitive layer.

5. A photographic element of claim 1 in which the ultraviolet absorbing optical brightening compound is incorporated in a layer under at least one light-sensitive layer.

6. A photographic support layer coated with at least one film-forming layer containing a 2-(nuclear substituted benzoxazolyl)-5-(nuclear substituted benzoxazolyl)thiophene ultraviolet-absorbing optical brightening agent in which the benzene ring of each benzoxazolyl group has as nuclear substituents from two to four alkyl groups, and at least one film-forming layer containing light-sensitive silver halide.

7. A photographic element of claim 6 in which the ultraviolet absorbing optical brightening compound is 2,5-bis-(5,7-di-amylbenzoxazolyl)thiophene.

8. A photographic element of claim 6 in which the ultraviolet absorbing optical brightening compound is 2,5-bis-(5,7-di-t-amylbenzoxazolyl)thiophene.

9. A photographic element of claim 6 in which the ultraviolet absorbing optical brightening compound is 2,5-bis-(5,7-di-t-amylbenzoxazolyl)-3,4-dimethyl thiophene.

10. A photographic element of claim 6 in which the ultraviolet asborbing optical brightening compound is 2,5-bis-(5,7-di-t-amylbenzoxazolyl)-3,4-dimethyl thiophene.

11. A photographic element of claim 6 in which the ultraviolet absorbing optical brightening compound is 2,5-bis-(5,7-dimethylbenzoxazolyl)thiophene.

12. A photographic element of claim 6 in which the ultraviolet absorbing optical brightening compound is 2,5-bis-(4,6,7-trimethylbenzoxazolyl)thiophene.

13. A photographic element of claim 1 in which the ulrtaviolet absorbing optical brightening compound is 4-methyl-2,5-di(5,7-di-t-amylbenzoxazolyl)thiazole.

References Cited

UNITED STATES PATENTS

| | | | |
|---|---|---|---|
| 2,995,564 | 8/1961 | Duennenberger et al. | 260—307.4 |
| 3,095,421 | 6/1963 | Liechti et al. | 260—307.4 |
| 3,336,330 | 8/1967 | Schinzel et al. | 260—307.4 |
| 3,406,070 | 10/1968 | Oetiker et al. | 96—82 |

RONALD H. SMITH, Primary Examiner

U.S. Cl. X.R.

96—84; 252—300; 260—307.4

PO-1050
(5/69)

UNITED STATES PATENT OFFICE
CERTIFICATE OF CORRECTION

Patent No. 3,499,762            Dated March 10, 1970

Inventor(s) Homer W. J. Cressman and Robert J. Tuite

It is certified that error appears in the above-identified patent and that said Letters Patent are hereby corrected as shown below:

Column 14, line 13, Claim 2 that portion of the formula reading $$\begin{array}{c} Z_2 \\ | \\ C= \end{array} \quad \text{should read} \quad \begin{array}{c} Z_2 \\ | \\ -C= \end{array}$$

SIGNED AND
SEALED
JUL 28 1970

(SEAL)
Attest:

Edward M. Fletcher, Jr.
Attesting Officer

WILLIAM E. SCHUYLER, JR.
Commissioner of Patents